United States Patent
Gadot et al.

(10) Patent No.: US 12,480,922 B2
(45) Date of Patent: Nov. 25, 2025

(54) METHODS AND SYSTEMS FOR CHARACTERIZING METHANE EMISSION EMPLOYING MOBILE METHANE EMISSION DETECTION

(71) Applicant: Schlumberger Technology Corporation, Sugar Land, TX (US)

(72) Inventors: Raphael Gadot, Sugar land, TX (US); Ali Rezaei, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 109 days.

(21) Appl. No.: 18/533,261

(22) Filed: Dec. 8, 2023

(65) Prior Publication Data
US 2024/0192186 A1    Jun. 13, 2024

Related U.S. Application Data

(60) Provisional application No. 63/431,352, filed on Dec. 9, 2022, provisional application No. 63/386,691, filed on (Continued)

(51) Int. Cl.
*G01N 33/00*    (2006.01)
*G06T 7/00*    (2017.01)
(Continued)

(52) U.S. Cl.
CPC ....... *G01N 33/0027* (2013.01); *G06T 7/0004* (2013.01); *G06T 7/70* (2017.01);
(Continued)

(58) Field of Classification Search
CPC ..... G01N 33/0027; G06T 7/0004; G06T 7/70; G06T 2207/10032; G06T 2207/20081; B64U 2101/26; B64U 2201/20
See application file for complete search history.

(56) References Cited

U.S. PATENT DOCUMENTS

| 10,662,765 | B2 | 5/2020 | Ferguson |
| 2017/0097274 | A1 | 4/2017 | Thorpe |

(Continued)

FOREIGN PATENT DOCUMENTS

| CN | 107300927 A | 10/2017 |
| WO | 2020018867 A1 | 1/2020 |

(Continued)

OTHER PUBLICATIONS

Emran et al., "Low-Altitude Aerial Methane Concentration Mapping," Aug. 10, 2017 [online] <URL:https://www.mdpi.com/2072-4292/9/8/823 > (Year: 2017).*

(Continued)

*Primary Examiner* — Scott A Browne
*Assistant Examiner* — Jason Nguyen
(74) *Attorney, Agent, or Firm* — Jeffrey D. Frantz

(57) ABSTRACT

Approaches to characterizing methane emission at an industrial facility using an unmanned air vehicle (UAV) equipped with navigational instruments and methane gas sensors. A scan area associated with the industrial facility is defined. The scan area can be logically partitioned into a plurality of pixels based on information provided by an intelligent agent. A flight plan for a flight of the UAV can be created to cover the pixels of the scan area. The UAV can execute the flight plan and collect time-series navigational data and time-series sensor data as the UAV executes the flight plan. The flight path of the UAV can be dynamically adjusted during the flight by an agent to ensure that the flight path of the UAV covers the scan area. A two-dimensional (2D) image of methane concentration over the scan area can be constructed from the time-series navigational data and the time-series sensor data.

20 Claims, 15 Drawing Sheets

Related U.S. Application Data on Dec. 9, 2022, provisional application No. 63/386,698, filed on Dec. 9, 2022.

(51) Int. Cl.
*G06T 7/70* (2017.01)
*B64U 101/26* (2023.01)

(52) U.S. Cl.
CPC ...... *B64U 2101/26* (2023.01); *B64U 2201/20* (2023.01); *G06T 2207/10032* (2013.01); *G06T 2207/20081* (2013.01)

(56) References Cited

U.S. PATENT DOCUMENTS

| | | | |
|---|---|---|---|
| 2018/0224854 A1* | 8/2018 | Mullan | H04L 67/12 |
| 2018/0292286 A1 | 10/2018 | Dittberner | |
| 2018/0292374 A1 | 10/2018 | Dittberner et al. | |
| 2020/0182779 A1 | 6/2020 | Kasten | |
| 2021/0076662 A1* | 3/2021 | Mikesell | G02B 26/101 |
| 2021/0140934 A1 | 5/2021 | Smith | |
| 2021/0255157 A1 | 8/2021 | Rashid | |
| 2023/0326201 A1 | 10/2023 | Rashid | |
| 2024/0319370 A1 | 9/2024 | Embry et al. | |

FOREIGN PATENT DOCUMENTS

| | | |
|---|---|---|
| WO | 2020206008 A1 | 10/2020 |
| WO | 2021067844 A1 | 4/2021 |
| WO | 2023133345 A1 | 7/2023 |

OTHER PUBLICATIONS

Barchyn et al., "Plume detection modeling of a drone-based natural gas leak detection system" Jan. 1, 2019 [online] <URL: https://online.ucpress.edu/elementa/article/doi/10.1525/elementa.379/112508/Plume-detection-modeling-of-a-drone-based-natural> (Year: 2019).*

An et al., "Variational Autoencoder based Anomaly Detection using Reconstruction Probability" Dec. 27, 2015 [online] (Year: 2015).*

Galfalk et al., "Sensitive Drone Mapping of Methane Emissions without the Need for Supplementary Ground-Based Measurements" Jul. 28, 2021 [online] <URL: https://pubs.acs.org/doi/10.1021/acsearthspacechem.1c00106> (Year: 2021).*

Olaguer, E. P. et al., "Landfill Emissions of Methane Inferred from Unmanned Aerial Vehicle and Mobile Ground Measurements", Atmosphere, 2002, 13(6), 983, 19 pages.

Galfalk, M. et al., "Sensitive Drone Mapping of Methane Emissions without the Need for Supplementary Ground-Based Measurements", ACS Earth and Space Chemistry, 2021, 5(10), pp. 2668-2676.

Shaw, J. T. et al., "Methods for quantifying methane emissions using unmanned aerial vehicles: a review", Philosophical Transactions of the Royal Society A, 2021, 379(2210), 20200450, 21 pages.

Barchyn, T. E., et al., "A UAV-based system for detecting natural gas leaks", Journal of Unmanned Vehicle Systems, 2017, 6(1), pp. 18-30.

Barchyn, T. E. et al., "Plume detection modeling of a drone-based natural gas leak detection system", Elementa: Science of the Anthropocene, 2019, 13 pages.

Emran, B. J. et al., Low-altitude aerial methane concentration mapping. Remote Sensing, 2017, 9(8), 823, 13 pages.

An, J. et al., "Variational Autoencoder based Anomaly Detection using Reconstruction Probability," Special Lecture on IE, 2015, 2(1), 18 pages.

\* cited by examiner

METHODS AND SYSTEMS FOR CHARACTERIZING METHANE EMISSION EMPLOYING MOBILE METHANE EMISSION DETECTION

CROSS-REFERENCE TO RELATED APPLICATIONS

The present disclosure claims priority from i) U.S. Provisional Patent Appl. No. 63/386,698, filed on Dec. 9, 2022, entitled "METHODS AND SYSTEMS FOR CHARACTERIZING METHANE EMISSION EMPLOYING MOBILE METHANE EMISSION DETECTION;" ii) U.S. Provisional Patent Appl. No. 63/386,691, filed on Dec. 9, 2022, entitled "METHODS AND SYSTEMS FOR EVALUATING QUALITY OF DATA RELATED TO MOBILE METHANE EMISSION DETECTION;" and iii) U.S. Provisional Patent Appl. No. 63/431,352, filed on Dec. 9, 2022, entitled "METHODS AND SYSTEMS FOR CHARACTERIZING METHANE EMISSION EMPLOYING MOBILE METHANE EMISSION DETECTION;" which are all incorporated by reference herein in their entireties.

FIELD

The present disclosure relates to methods and systems that employ air vehicles equipped with one or more methane sensors for mobile detection of methane emission in industrial facilities.

BACKGROUND

Air vehicles equipped with one or more methane sensors can provide an essential role in methane monitoring services, complementing permanent sensor installations in more complex facilities such as offshore oil and gas platforms. One or more methane sensors are typically mounted on a plane or an unmanned aerial vehicle (UAV) and the plane or UAV is flown around an industrial facility searching for methane leaks, identifying their locations, and quantifying such methane leaks to the extent possible. The methane sensor can provide a point measurement of methane concentration; or an area or line measurement of methane concentration in the case of OGI or LiDAR-based scanners. Examples of using UAVs for gas concentration measurements can be found in the literature, such as in i) Olaguer, E. P., Jeltema, S., Gauthier, T., Jermalowicz, D., Ostaszewski, A., Batterman, S., . . . & Zhu, J. (2022). Landfill Emissions of Methane Inferred from Unmanned Aerial Vehicle and Mobile Ground Measurements. Atmosphere, 13(6), 983; ii) Gålfalk, M., Nilsson Påledal, S., & Bastviken, D. (2021). Sensitive Drone Mapping of Methane Emissions without the Need for Supplementary Ground-Based Measurements. ACS Earth and Space Chemistry, 5(10), 2668-2676; iii) Shaw, J. T., Shah, A., Yong, H., & Allen, G. (2021). Methods for quantifying methane emissions using unmanned aerial vehicles: a review. Philosophical Transactions of the Royal Society A, 379(2210), 20200450; iv) Barchyn, T. E., Hugenholtz, C. H., Myshak, S., & Bauer, J. (2017). A UAV-based system for detecting natural gas leaks. Journal of Unmanned Vehicle Systems, 6(1), 18-30; v) Barchyn, T. E., Hugenholtz, C. H., & Fox, T. A. (2019). Plume detection modeling of a drone-based natural gas leak detection system. Elementa: Science of the Anthropocene, 7; and vi) Emran, B. J., Tannant, D. D., & Najjaran, H. (2017). Low-altitude aerial methane concentration mapping. Remote Sensing, 9(8), 823.

The state-of-the-art technology for detecting methane emissions using air vehicles is semi-manual flights, which involve three steps shown in FIG. 1A. In the first step 101, pre-planning operations define an area for scanning. The decisions on the scan area dimensions and its distance from a suspected methane emitting structure are typically based on some suggestion from running a physics-based model. In the second step 103, the flight is executed in the presence of a pilot and time-series data (e.g., GPS data, velocity data, methane concentration data) is collected and recorded during the flight. In the third step 105, the collected data is post-processed manually for calculating rate of methane emission and localizing the plume of methane. Note that the air vehicle can be a UAV equipped with a methane gas sensor with a particular frequency. Also note that once the flight parameters, such as velocity, are set, they are not changed during flight unless there is an emergency. Any interruption in the flight execution is controlled by the pilot based on the pilot's assessment of the situation.

FIG. 1B shows a typical graphical user interface for visualizing post-processed data. The graphical user interface plots the point concentrations of methane on the flight trajectory as bubbles. The bigger the bubbles and the warmer the colors indicate the higher concentration of methane, which in this case occurs at the northeast side of the scanned area. If the flight was executed on a mesh-type flight trajectory, an interpolation between the points could generate a contour plot of concentrations. It is important to note that in the post-processing stage, the flight is being completed, and unless the flight is repeated, the user will not have the luxury of controlling the data collection process.

Regardless of the specific methane sensor mounted on the air vehicle, the methods for detecting methane emission and quantifying the rate of methane emission have specific requirements different from permanent sensor installations. One question that should be answered before performing any post-processing steps that detect methane emission and/or quantify the rate of methane emission is whether the quality of the data collected during the flight of the air vehicle is satisfactory and thus can be relied upon and used by such post-processing steps.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods and systems are provided for characterizing methane emission at an industrial facility from a flight of an unmanned air vehicle (UAV) equipped with at least one navigational instrument and at least one methane gas sensor. A scan area associated with the industrial facility is defined. The scan area can be logically partitioned into a plurality of pixels based on information provided by an intelligent agent. A flight plan for a flight of the UAV can be defined, wherein the flight plan covers the pixels of the scan area. The UAV can be operated to execute the flight plan and collect time-series navigational data from the at least one navigational instrument and time-series sensor data from the at least one methane sensor as the UAV executes the flight plan. The flight plan (or flight path) of the UAV can be dynamically adjusted during the flight by operation of the intelligent agent to ensure that the flight path of the UAV covers the pixels of the scan area. At least one two-dimensional (2D) image of methane concentration over the pixels of the scan area can be constructed from the time-series navigational data and the time-series sensor data.

In embodiments, the intelligent agent can be configured to use at least one model to dynamically adjust the speed or stabilization of the UAV during the flight. For example, the at least one model can include a physics-based model and/or an artificial intelligence model.

In embodiments, the at least one 2D image can be processed using artificial intelligence and/or computer vision algorithms to identify anomalies or patterns related to methane emission at the industrial facility. For example, the processing of the at least one 2D image employ an autoencoder configured to identify anomalies or patterns related to methane emission at the industrial facility.

In embodiments, the processing of the at least one 2D image can be configured to estimate rate of methane emission and source location of methane emission at the industrial facility. For example, the processing of the at least one 2D image can employ an artificial intelligence model configured to quantify the rate of methane emission and estimate the approximate location of the source of the methane emission at the industrial facility.

In embodiments, the processing of the at least one 2D image can be configured to visualize the rate of methane emission and the source location of the methane emission at the industrial facility.

In embodiments, the intelligent agent can be configured to provide information used to define the flight plan such that the spatial distribution of pixels in the scan area and the time-series sensor data collected during the flight and the at least one 2D image derived therefrom comply with the input of the artificial intelligence and/or computer vision algorithms.

In embodiments, the pixels can be subsquares that cover the scan area, and/or the scan area can be defined in at least one 2D plan spaced from the industrial facility, such as in one or more vertical 2D planes spaced from the industrial facility or in a horizontal 2D plane spaced above the industrial facility.

In embodiments, wind speed and direction at or near the industrial facility at the time of the flight can be determined from data provided by a weather station or a weather monitoring service, and such wind speed and direction can be used in defining the scan area.

In embodiments, the at least one 2D image can be constructed by scaling raw methane concentration readings to a predefined range of pixel values over the pixels of the scan area.

In embodiments, the at least one 2D image can be constructed using an image smoothing algorithm, such as a spline smoothing algorithm or a sinc smoothing algorithm.

In embodiments, the flight of the UAV can operate under remote control by a human operator, or with various degrees of autonomy, such as autopilot assistance up to a fully autonomous aircraft that has no provision for human intervention.

In embodiments, at least part of the method or system is performed by at least one processor.

In embodiments, the industrial facility can be an offshore oil and gas platform, an onshore wellsite, a hydrocarbon processing facility, or a chemical plant.

In another aspect, methods and systems are provided that employ a mind map that includes multiple binary decision trees for evaluating the quality of data related to a flight of an air vehicle equipped with one or more methane sensors for methane emission detection at an industrial facility.

In embodiments, the mind map can be configured to generate a numerical data value that relates to predicted success of the flight and predicted quality of the data obtained by the flight. In embodiments, the numerical data value can represent a probability score between 0 and 1 that indicates probability of a successful flight and predicted quality of data obtained from the flight.

In embodiments, the multiple binary decision trees of the mind map can each be configured to process the data to determine a binary classification label associated with the data, and the numeric data value can be generated from the binary classification labels determined by the multiple binary decision trees.

In embodiments, the numeric data value can be based on weights associated with predefined binary classification labels determined by the multiple binary decision trees. For example, a probability score between 0 and 1 that indicates probability of a successful flight and predicted quality of data obtained from the flight can be determined by adding the weights associated with predefined binary classification labels determined by the multiple binary decision trees.

In embodiments, the numerical data value can be evaluated (for example, against a predefined threshold value) to determine whether to selectively use the data in post-processing operations that detect methane emission at the industrial facility from the data.

In embodiments, the numerical data value can be evaluated (for example, against a predefined threshold value) to determine whether to selectively schedule and perform an additional flight of the air vehicle to obtain data related to detection of methane emission at the industrial facility.

In embodiments, the data processed by the mind map can include data from different data sources. For example, the data sources can be selected from the group consisting of: flight data, weather data, methane sensor data, and pre-flight plan data.

In embodiments, the data processed by the mind map can include at least one data type selected from the group consisting of: a binary data type, a scalar data type, a time-series data type, and combinations thereof.

In embodiments, the processing of the data by the mind map can be performed by a processor.

In embodiments, the air vehicle can be selected from the group consisting of: a plane, and a UAV.

In embodiments, the industrial facility can be an offshore oil and gas platform, an onshore wellsite, a hydrocarbon processing facility, or a chemical plant.

In yet another aspect, methods and systems are provided for characterizing methane emission at an industrial facility from a flight of an unmanned air vehicle (UAV) equipped with at least one navigational instrument and at least one methane gas sensor. The methods include three distinct stages: a pre-flight stage, a flight execution stage, and a post-flight stage. In the pre-flight stage, flight path data for a flight of the UAV is defined. In the flight execution stage, the UAV is flown and the flight of the UAV is controlled based on the flight path data. Time-series navigational data from the at least one navigational instrument and time-series sensor data from the at least one methane gas sensor are collected and recorded during the flight of the UAV. In the post-flight stage, the time-series navigational data and the time-series methane gas sensor data are processed to check the quality of such time-series navigational data and time-series methane gas sensor data, and the time-series navigational data and time-series methane gas sensor data are selectively post-processed based on the quality check.

In embodiments, the selective post-processing of the time-series navigational data and time-series methane gas sensor data can use artificial intelligence and/or computer vision algorithms to estimate rate of methane emission and source location of methane emission at the industrial facility. The selective post-processing can also be configured to visualize and/or interpret the rate of methane emission and the source location of the methane emission at the industrial facility.

In embodiments, the flight path data can be based on weather information obtained from at least one weather station or a weather service.

In embodiments, the flight path data can be determined by running a physics-based model.

In embodiments, the flight path data can be configured to cover at least one scan area associated with the industrial facility.

In embodiments, the scan area can be spaced downwind from the industrial facility (for example, in high wind conditions) or spaced above the industrial facility (for example, in low wind conditions).

In embodiments, the flight of the UAV can be operated under remote control by a human operator, or with various degrees of autonomy, such as autopilot assistance up to a fully autonomous aircraft that has no provision for human intervention.

In embodiments, the industrial facility can be an offshore oil and gas platform, an onshore wellsite, a hydrocarbon processing facility, or a chemical plant.

In embodiments, at least part of the method can be performed by a processor.

Other aspects of the present disclosure are described and claimed.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1A:
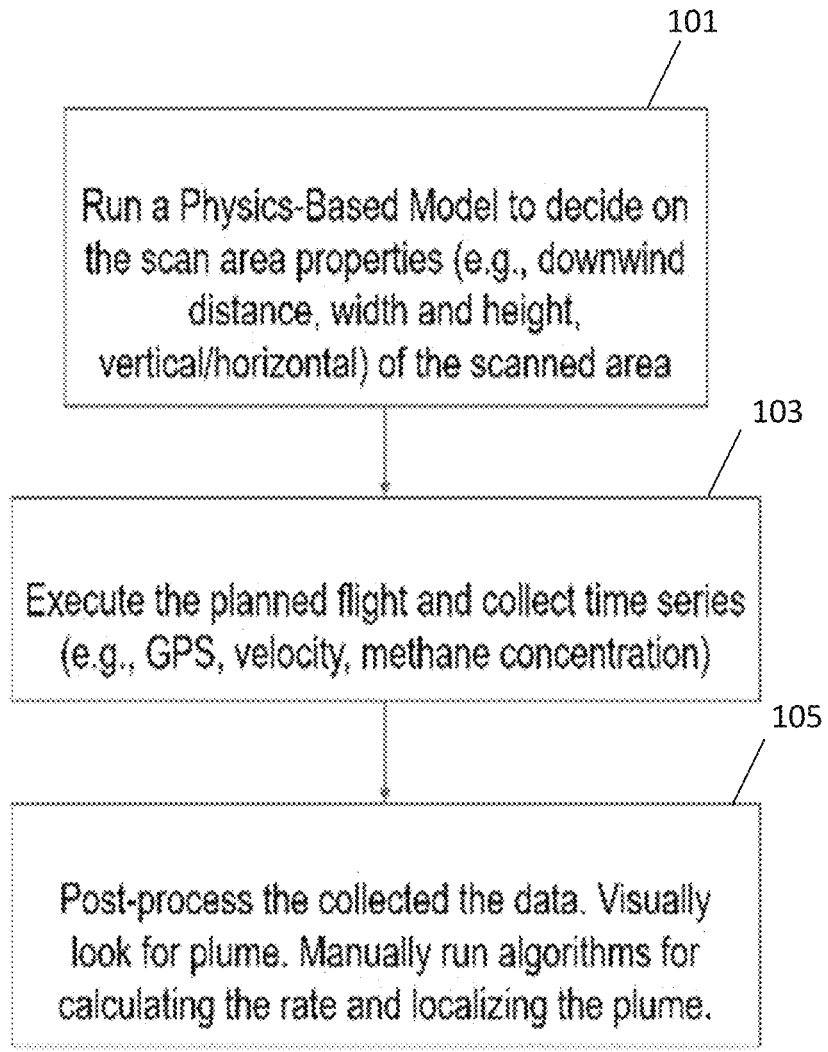
FIG. 1A is a flow chart illustrating state-of-the-art technology for mobile detection of methane emissions using an air vehicle.
Figure 1B:
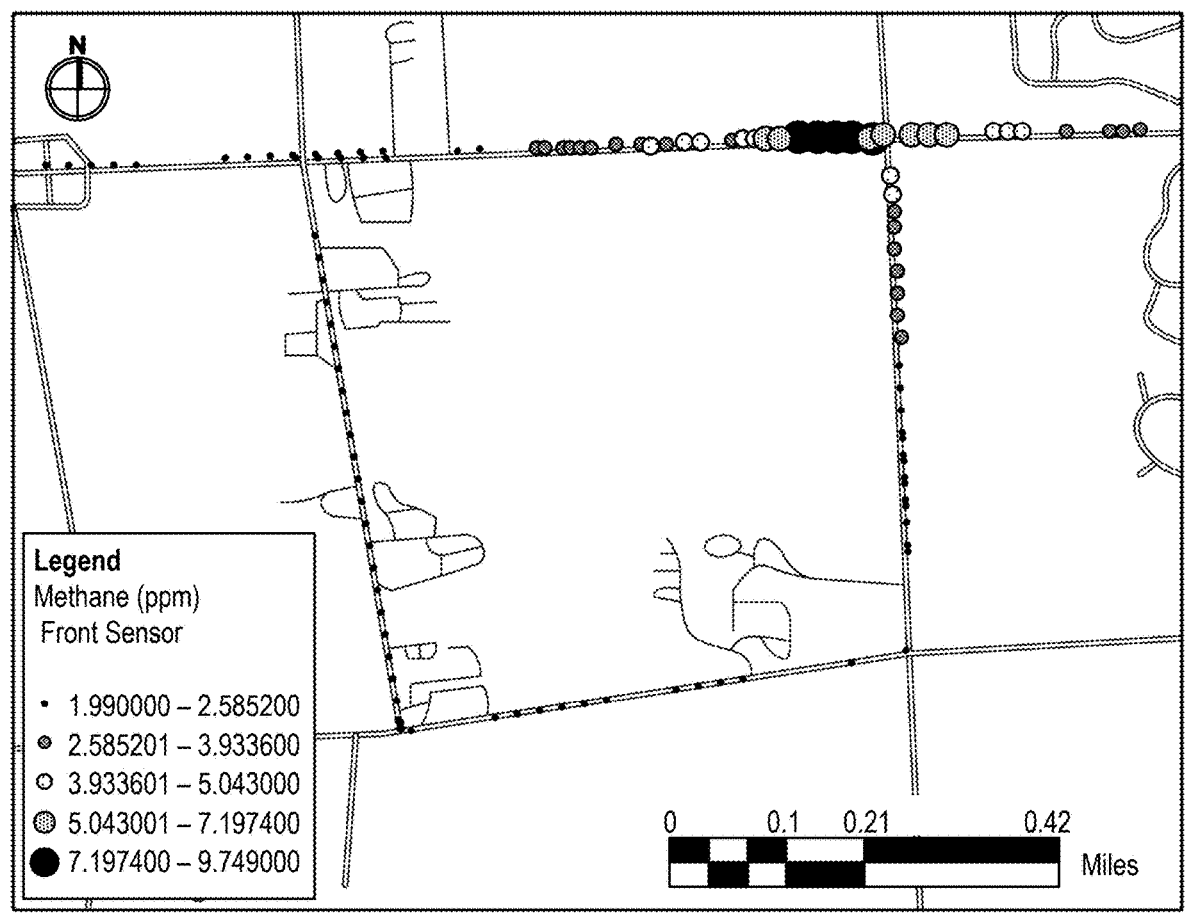
FIG. 1B shows a typical graphical user interface for visualizing post-processed data derived from mobile detection of methane emissions using an air vehicle.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

It is to be understood that the present disclosure provides many different embodiments, or examples, for implementing different features of various embodiments. Specific examples of components and arrangements are described below to simplify the present disclosure. These are, of course, merely examples and are not intended to be limiting.

UAVs are the preferred solutions for mobile methane leak detection in several situations and specific payloads. However, several uncertainties, from the physics of the problem to the parameters related to the UAV itself, create some difficulties in detecting the methane plume with high accuracy and confidence. Most technologies that use a UAV equipped with methane gas sensor rely on time-series readings of methane concentrations and adjust for other parameters to visualize the methane plume on the flight path after post-processing the data.

According to one aspect of the present disclosure, an intelligent agent can be configured to control the flight plane (or flight path) of the UAV and starts by defining pixels distributed over a scan area as the first step. In this representation, the scan area can be a vertical or horizontal two-dimensional (2D) plane logically partitioned into several subsquares or pixels. During the flight of the UAV, the intelligent agent dynamically adjusts the flight plane (or flight path) of the UAV in real-time such that the flight path of the UAV covers the pixels distributed over the scan area, and the methane gas sensor of the UAV can be configured to measure methane concentration within each pixel of the scan area. The measurements of methane concentration in each pixel can be used to construct one or more 2D images of methane concentration over the pixels of the scan area. In embodiments, as part of constructing the 2D image(s), the measurements of methane concentration in each pixel can be scaled to values in the range of 0-255, which correspond to values for black and white in the RGB scale. The 2D image(s) can then be processed using artificial intelligence and/or computer vision algorithms to identify anomalies or patterns related to methane emission at the industrial facility and estimate rate of methane emission and source location of methane emission at the industrial facility. For example, a machine learning system (e.g., autoencoder) configured for anomaly detection can process the 2D image(s) to identify and localize anomalies in the 2D image(s), which unusually represent high concentration of methane. For example, the anomaly detection can employ an autoencoder as described in An, J., & Cho, S., "Variational autoencoder based anomaly detection using reconstruction probability," Special Lecture on IE, 2(1), 2015, pgs. 1-18. To efficiently populate the pixels of the 2D image(s), the intelligent agent can use a physics-based model and/or an AI-based model to dynamically adjust parameters of the UAV, such as speed, stabilization, and the lag between the time when gas molecules reach the tube of the methane gas sensor until the methane gas sensor "feels" them. This step can be configured to ensure that the pixels of the 2D image(s) are populated efficiently. The intelligent agent can also be configured to dynamically change the flight parameters of the UAV in real-time to ensure high-quality 2D image(s) of methane emission (e.g., methane plume). Once an anomaly is detected in the 2D image(s), another AI model can be utilized to quantify the rate of methane emission and estimate the approximate location of the source of the methane emission at the industrial facility.

Figure 2:
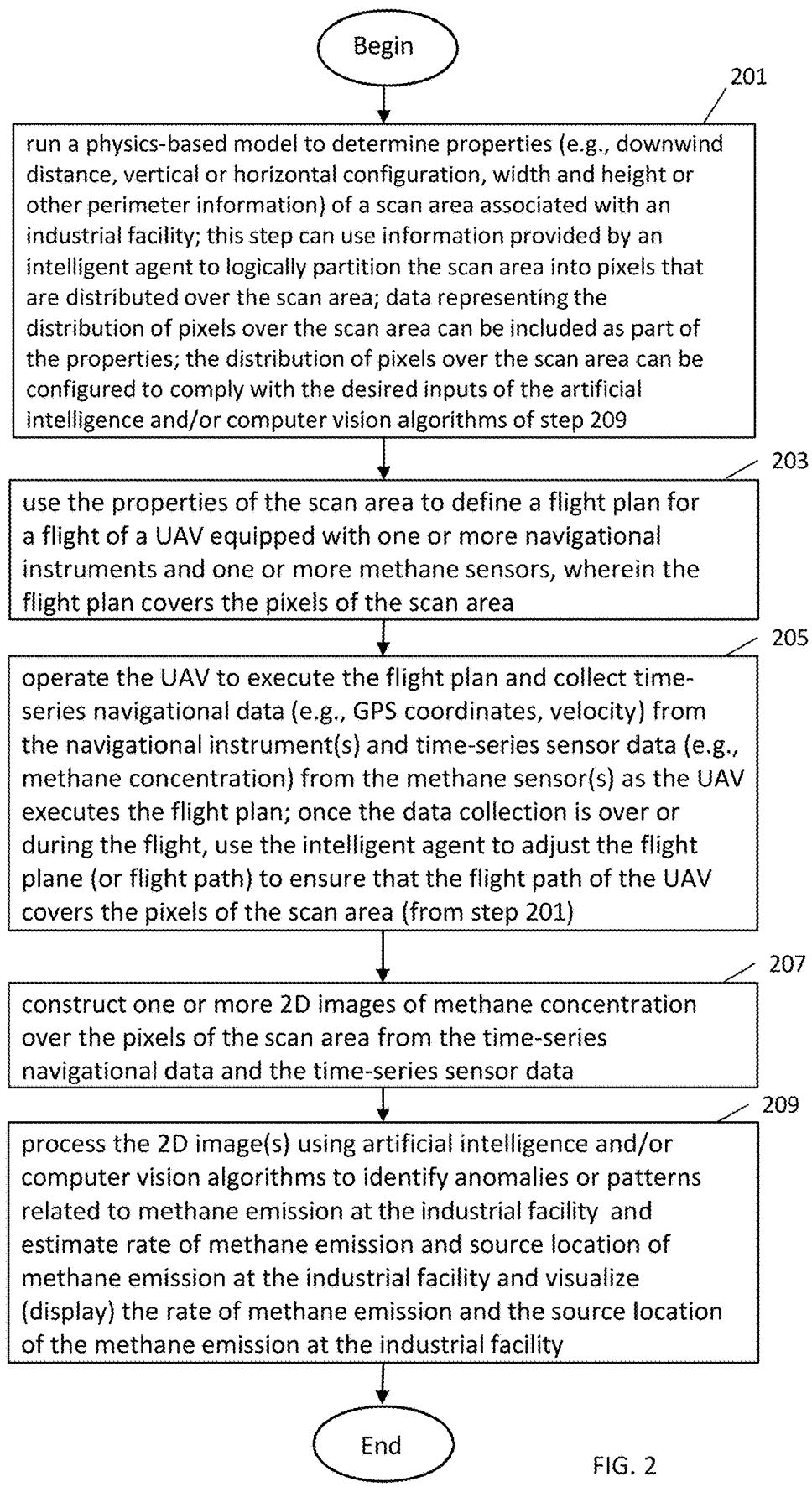
FIG. 2 is a flowchart that illustrates an embodiment of a method of the present disclosure.

FIG. 2 is a flowchart that illustrates an embodiment of the method of the present disclosure. In step 201, a physics-based model can be run to determine properties of a scan area associated with an industrial facility. For example, the scan area properties can include downwind distance from the industrial facility, vertical or horizontal configuration, wind and height or other perimeter information, or other useful information. This step can use information provided by an intelligent agent to logically partition the scan area into pixels that cover the scan area, and data representing the spatial distribution of pixels over the scan area can be included as part of the properties. In embodiments, the spatial distribution of pixels over the scan area can be configured to comply with the desired inputs of the artificial intelligence and/or computer vision algorithms of step 209.

In step 203, the scan area properties can be used to define a flight plan for a flight of a UAV equipped with one or more navigational instruments and one or more methane sensors, wherein the flight plan covers the pixels of scan area of 201.

In step 205, the UAV can be operated to execute the flight plan and collect time-series navigational data (e.g., GPS coordinates, velocity) from the navigational instrument(s) and time-series sensor data (e.g., measurements of methane concentration) from the methane sensor(s) as the UAV executes the flight plan. The flight of the UAV may operate under remote control by a human operator, or with various degrees of autonomy, such as autopilot assistance up to a fully autonomous aircraft that has no provision for human intervention. Once the data collection is over or during the flight, the intelligent agent can be used to adjust the flight plane (or flight path) of the UAV to ensure that the flight path of the UAV covers the pixels of the scan area (from step 201). In this step, the intelligent agent can communicate with the UAV to dynamically adjust the flight plan (or flight path) of the UAV during the flight.

In step 207, one or more 2D images of methane concentration over the pixels of the scan area can be constructed from the time-series navigational data and the time-series sensor data of 205.

In step 209, the 2D image(s) can be processed using artificial intelligence and/or computer vision algorithms to identify anomalies or patterns related to methane emission at the industrial facility and estimate rate of methane emission and source location of methane emission at the industrial facility. The processing of step 209 can also be configured to visualize (display) the rate of methane emission and the source location of the methane emission at the industrial facility.

Figure 3:
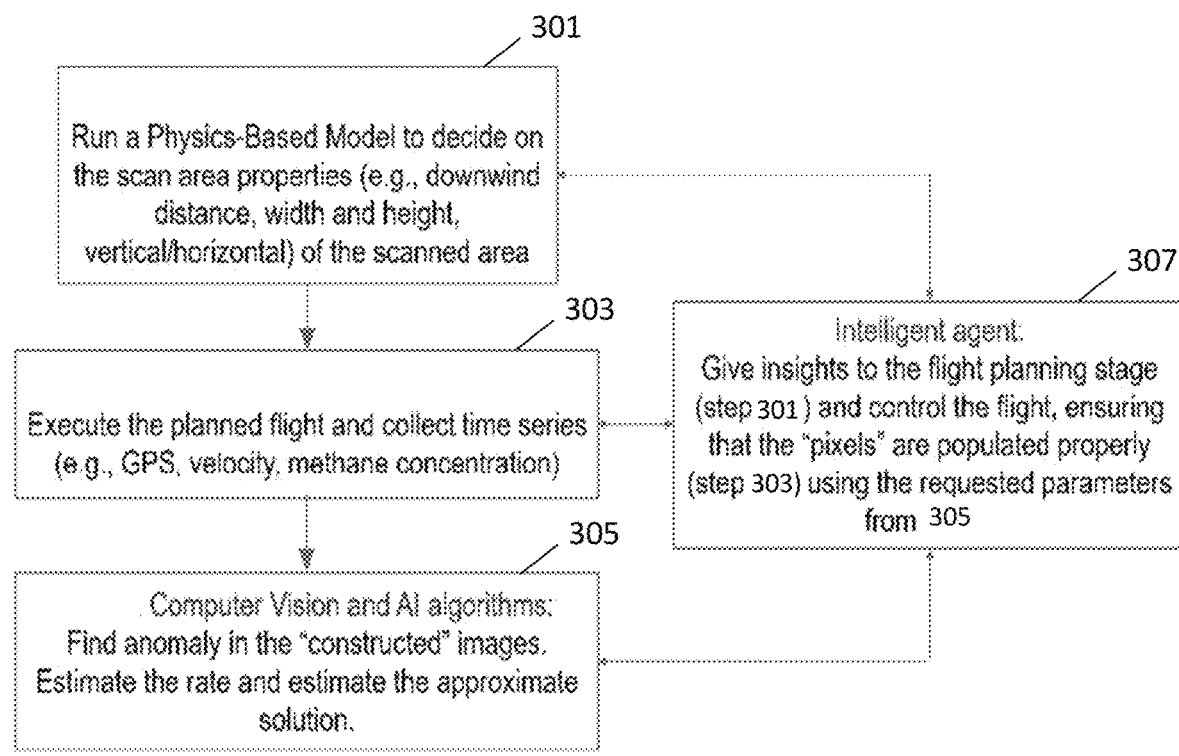
FIG. 3 is a flowchart that illustrates another embodiment of a method of the present disclosure.

FIG. 3 is a flowchart that illustrates another embodiment of the method of the present disclosure which is similar to the method of FIG. 2.

As mentioned above, prior art methods that detect methane emissions use a three-step semi-manual process (see FIG. 1A). Although the end goal of the process is to record high quality data that makes interpretations easy in step 105, in reality, the focus is put on the first two steps 101 and 103 (i.e., to plan and execute a good flight). This is because UAVs are widely used for applications other than emissions detection. There is little consideration regarding what the user wants to see and interpret in the flight planning and execution stages. In this context, the first goal of the present disclosure is to use an ideal final product (i.e., two-dimensional plot(s) of methane concentration) as parameters to design a scan area and flight path that covers the pixels of scan area wherein the spatial distribution of pixels over the scan area optimizes the parameters collected during the flight.

Figure 4A:
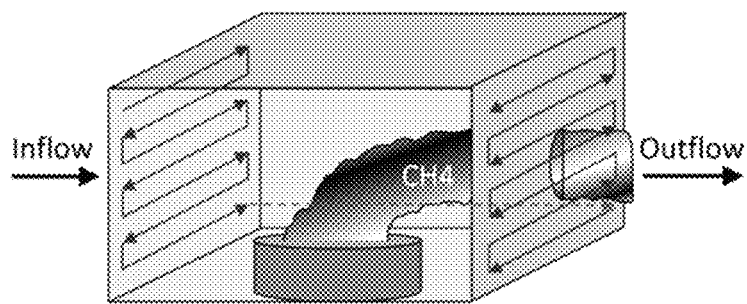
FIGS. 4A and 4B are schematic illustrations of scan areas that can be used for mobile detection of methane emissions according to the present disclosure.
Figure 4B:
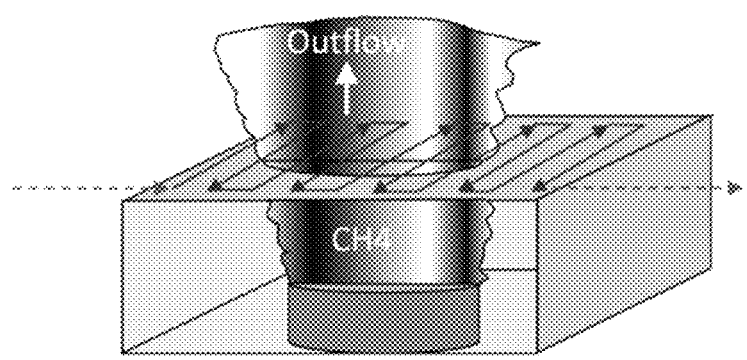

Example flight scan areas are shown in FIGS. 4A and 4B. In FIG. 4A, the scan area(s) is defined in one or more vertical 2D planes spaced from an industrial facility. This configuration is suitable for moderate to high wind speed conditions. The vertical planes can be located in a downwind direction from the industrial facility or in an upwind direction from the industrial facility as shown. The wind speed or condition and the downwind and upwind direction of the wind can be determined from the predominate wind speed and direction at or near the industrial facility at the time of the flight as provided by a weather station or weather monitoring service. In FIG. 4B, the scan area is defined in a horizontal 2D plane spaced above an industrial facility. This configuration is suitable for low wind speed conditions. As can be seen, no matter how the flight schedule looks, the data recording always generates a vector of parameters (i.e., time-series data of the methane concentration and other parameters). The time-series data typically has variable frequencies that require synchronization prior to post-processing for further analysis. It should be noted that at the flight design stage, attention can be paid to physics-based models to make decisions on the flight path parameters.

Figure 5:
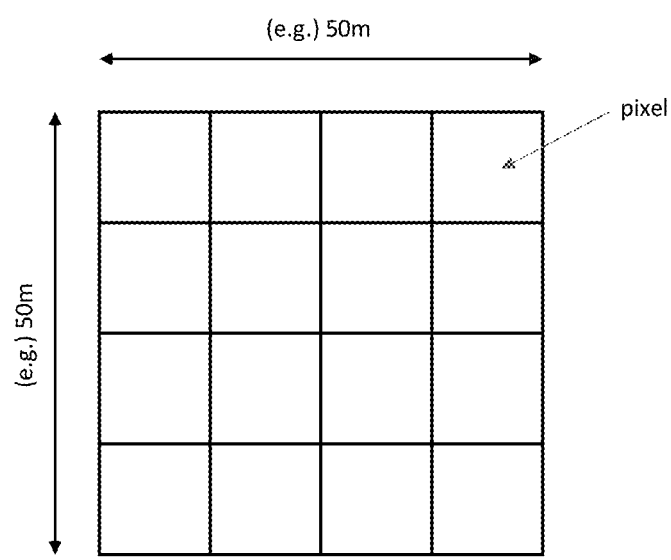
FIG. 5 is a schematic illustration of a logical partitioning of a scan area into a 4×4 array of pixels according to the present disclosure.
Figures 6A, 6B:
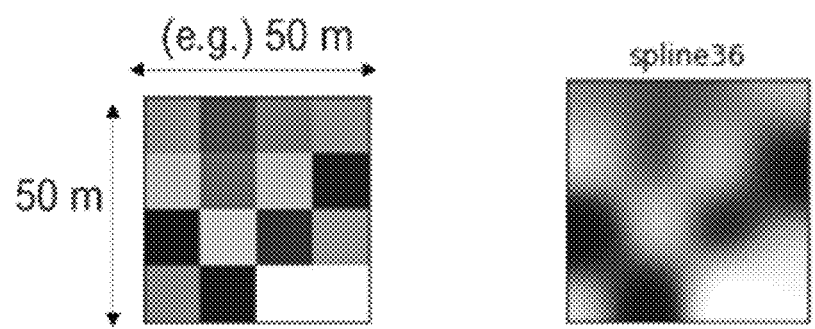
FIGS. 6A, 6B and 6C illustrate two-dimensional images of methane concentration over the array of pixels of the scan area of FIG. 5.
Figure 6C:
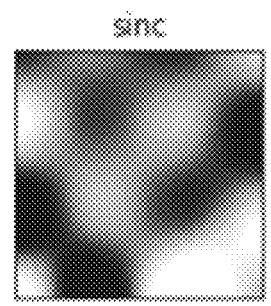

An example of the spatial distribution of pixels of in a flight scan area is shown in FIG. 5. In this case, a scan area of 50 m×50 m is considered. The flight scan area is divided into 4×4 pixels as shown. One or more 2D images of methane concentration corresponding to the pixels of the scan area can be derived from the raw concentration readings obtained by the methane sensor(s) during the flight. FIG. 6A illustrates an example 2D image wherein the color of the pixels is a number between 0-255 representing a scaled version of the raw concentration readings. FIG. 6B illustrates another example 2D image where the 2D image of FIG. 6A is subjected to a spline smoothing algorithm to create a smoother distribution of methane concentration in the scan area. FIG. 6C illustrates yet another example 2D image where the 2D image of FIG. 6A is subjected to a sinc smoothing algorithm to create a smoother distribution of methane concentration in the scan area. Note that the 2D image(s) can be processed by computer vision and AI processing. For example, different anomaly detection algorithms can be applied to the 2D image(s) to detect an anomaly (i.e., leak), estimate the rate based on intensity, and try to approximate where the methane emission is coming from.

Figure 7:
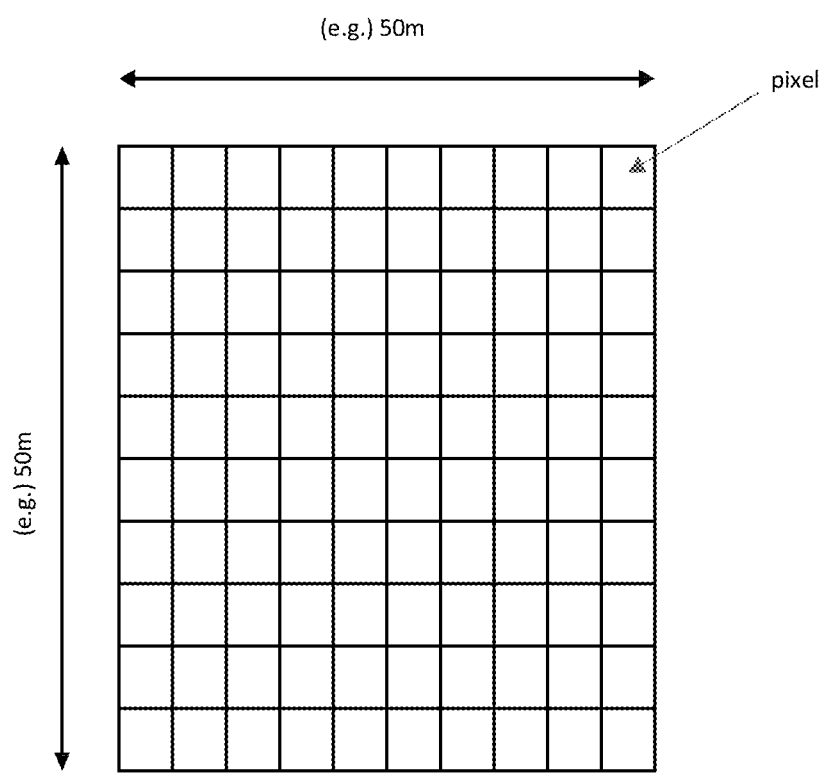
FIG. 7 is a schematic illustration of a logical partitioning of a scan area into a 10×10 array of pixels according to the present disclosure.
Figure 8A:
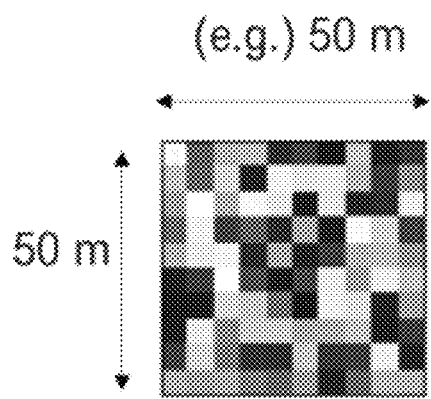
FIGS. 8A, 8B and 8C illustrate two-dimensional images of methane concentration over the array of pixels of the scan area of FIG. 7.
Figure 8B:
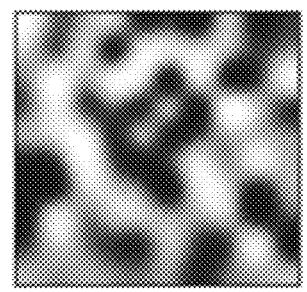
Figure 8C:
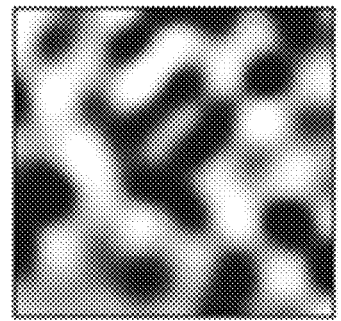

Another example of the spatial distribution of pixels in a flight scan area is shown in FIG. 7. In this case, a scan area of 50 m×50 m is considered. The flight scan area is divided into 10×10 pixels as shown. One or more 2D images of methane concentration corresponding to the pixels of the scan area can be derived from the raw concentration readings obtained by the methane sensor(s) during the flight. FIG. 8A illustrates an example 2D image wherein the color of the pixels is a number between 0-255 representing a scaled version of the raw concentration readings. FIG. 8B illustrates another example 2D image where the 2D image of FIG. 8A is subjected to a spline smoothing algorithm to create a smoother distribution of methane concentration in the scan area. FIG. 8C illustrates yet another example 2D image where the 2D image of FIG. 8A is subjected to a sinc smoothing algorithm to create a smoother distribution of methane concentration in the scan area. Note that the 2D image(s) can be processed by computer vision and AI processing. For example, different anomaly detection algorithms can be applied to the 2D image(s) to detect an anomaly (i.e., leak), estimate the rate based on intensity, and try to approximate where the methane emission is coming from.

In another aspect of the disclosure, a systematic and consistent workflow for checking flight quality for remote methane detection, reliability of the recorded parameters, and interpreting results are still in its infancy. The quality control is typically completed manually after the flight is finished, focusing only on the flight-related parameters. The process is often limited to reporting the collected data without paying much attention to the quality. However, when a customized payload is used on a flight for tasks such as methane emission detection, it can be important to ensure that the executed flight follows a pre-designed path with consistent predefined parameters such as velocity. Moreover, synchronization of the data recorded or used from different sources, such as weather stations, needs to be synchronized to analyze the correctness of the physics-based assumptions for designing the flight path. Moreover, there is no systematic flight quality control related to the quantity of interest (i.e., methane concentration).

In order to address these issues, a mind map can be provided for evaluating the quality of data related to a flight of an air vehicle equipped with one or more methane sensors for methane emission detection at an industrial facility, such as an offshore oil and gas platform. A mind map as described herein includes multiple binary decision trees that are configured to evaluate data obtained from multiple data sources related to such a flight. The multiple decision trees process the data to generate and output binary data values (i.e., binary classification labels) that relate to predicted success of the flight and predicted quality of the data obtained from the flight. For example, the binary data values can include a "1" data value that relates to predicted success of the flight and predicted satisfactory quality of the data obtained from the flight, or a "0" data value that relates to predicted failure of the flight and predicted non-satisfactory quality of the data obtained from the flight. The mind map combines the binary data values output from the multiple binary decision trees to generate a numerical data value that relates to predicted success of the flight and predicted quality of the data obtained from the flight. The numerical data value can be evaluated, for example, by comparison against a predefined threshold value, to determine whether to use the data obtained from the flight for post-processing steps that detect and/or quantify methane emissions at the industrial facility from the data, or omit use of the data from the flight in the post-processing steps and possibly schedule and perform an additional flight to obtain data that can be used in post-processing steps that detect and/or quantify methane emissions at the industrial facility.

A decision tree is a non-parametric supervised learning method used for classification and regression. The goal is to create a model that predicts a classification label by learning simple decision rules inferred from input data. The decision tree follows a general tree topology including a root node, a number of intermediate nodes, and leaf nodes, all linked by branches. The nodes of the tree are each assigned to one or more particular parameters or attributes of the input data together with one or more conditions that are applied to the assigned parameter(s) or attributes that define a split point in the domain of the parameter(s) or attribute(s). The split point can be used to define how the input data is sorted or passed to the nodes below. Each leaf node is configured to assign a particular binary classification label to the input data.

In embodiments, the input data can be sorted and/or processed at the nodes of the decision tree starting from root node and continuing down the intermediate nodes of the decision tree. At each node, the value(s) of the parameter(s) or attribute(s) of the input data which are assigned to the node can be compared to the condition(s) of the split point for the node, and then the input data can be passed to the next lower node of the tree according to the split point. Thus, for example, the root node may relate to an AGE parameter and have a split point defined by a condition that the AGE parameter is less than or equal to 30. The input data can be sorted at the root node so that if the AGE parameter of the input data has a value less than 30, the input data proceeds down one branch of the tree from the root node, but if the AGE parameter of the input data has a value greater than or equal to 30, the input data proceeds down another branch of the tree from the root node. The branches from the root node lead to intermediate nodes, which are also assigned to one or more particular parameters or attributes of the input data together with one or more conditions that are applied to the parameter(s) or attributes that define a split point in the domain of the parameter(s) or attribute(s). The input data can be processed at the appropriate intermediate node similar to the processing of the root node and this process is repeated until the process arrives at a leaf node which assigns a classification label. Note that the data parameters or attributes assigned to the nodes of decision tree need not be numerical values but may be categorical data, in which case the split point is a subset of the domain of the data parameter(s) or attribute(s).

In the context of the present disclosure, the mind map embodies multiple binary decision trees that output binary data values which are combined to generate a numerical data value that relates to predicted success of a flight and predicted quality of the data obtained from the flight. In embodiments, the multiple binary decision trees can be configured to process data from a plurality of data sources or data source types, including UAV flight data, weather data, sensor data, and pre-flight plan data. Also, regardless of the source of the data, the data types can be binary (e.g., whether a unit has been activated or not), scalar (e.g., battery charge, distance from downwind), and time-series (e.g., time-stamped GPS location and methane concentration). The output of the mind map is a numerical data value that relates to predicted success of a flight and predicted quality of the data obtained from the flight. For example, the numerical value can be a probability score between 0 and 1, indicating the probability of a successful flight and the predicted quality of data obtained from the flight. If this numerical data value is below a certain threshold (e.g., less than 0.75), the data obtained from the flight can be omitted from post-processing for detection and/or quantification of methane emission and an additional flight can possibly be scheduled and flown. Otherwise, for the case where the numerical value is at or above the threshold (e.g., greater than or equal to 0.75), the data for the flight can be post-processed for detection and/or quantification of methane emission.

In embodiments, once a flight is executed and completed, the data obtained from the flight, other payloads, and sources, such as a weather station, can be downloaded and/or stored in electronic form for processing that is configured to perform a systematic and unified quality control check on the recorded data. In embodiments, the quality check can embody a mind map that includes multiple decision trees as described herein. An example of the recorded data after a typical drone flight is presented in Table 1. As can be seen, the data is gathered from four different sources and can be in the form of time-series, scalars, or binaries. Note that the time-series data mentioned below do not necessarily have the same frequencies. A reliable quality control algorithm has to automatically import the recorded data from Table 1 and output a score related to the probability of a successful flight that obtained data of satisfactory quality.

TABLE 1

| Type of the Parameter/ Data Source | Parameter | Type of the data | Source |
| --- | --- | --- | --- |
| Weather station | Wind direction | Time-series | Anemometer |
| | Wind speed | Time-series | Anemometer |
| | Solar radiation | Time-series | Anemometer |
| | Temperature | Time-series | Anemometer |
| Flight planner | Distance down wind | Scalar | Plume model - Flight planner |
| | Width and height of the plane | Scalar | Plume model - Flight planner |
| UAV | Velocity | Time-series | UAV |
| | Time-stamped GPS and altitude | Time-series | UAV |
| | Roll, Yaw, Pitch | Time-series | UAV |
| | System log files | Binary | UAV |
| Methane Sensor | Methane concentration | Time-series | Methane Gas sensor |
| | Pressure | Time-series | Methane Gas sensor |

Figure 9:
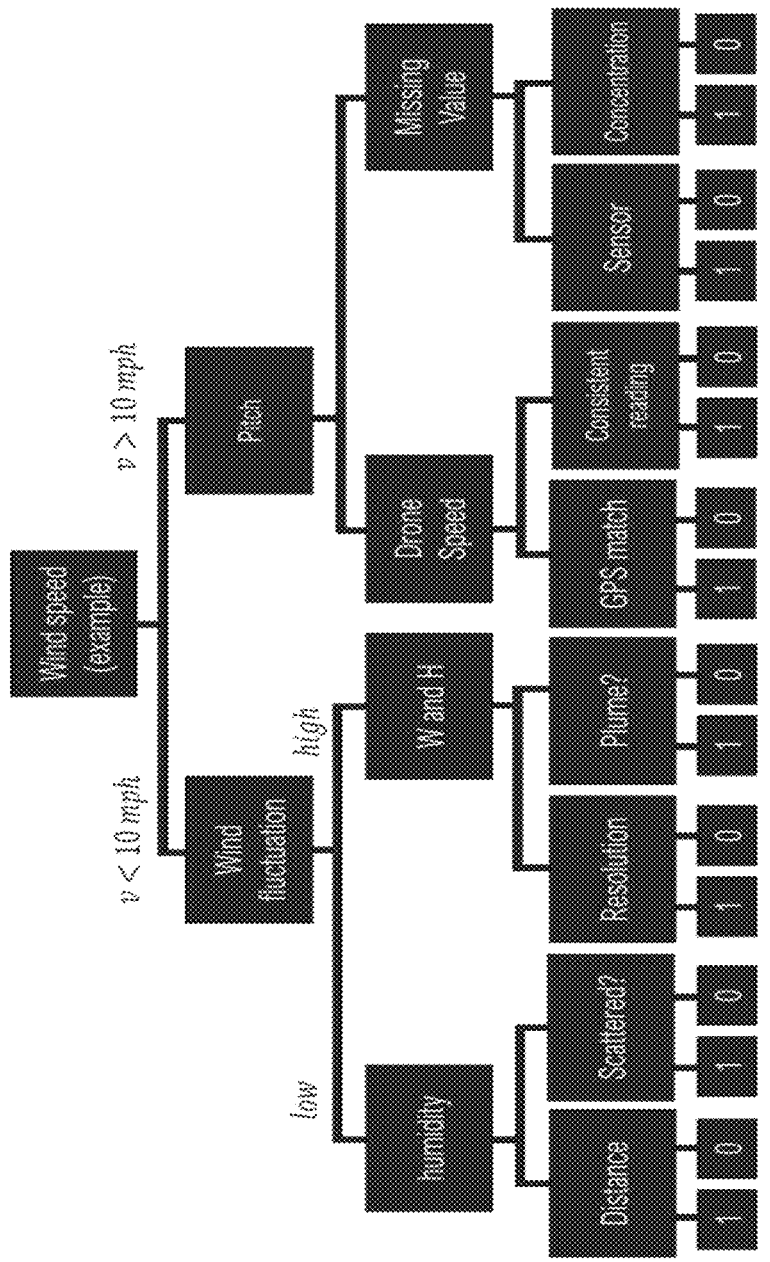
FIG. 9 is a schematic diagram of an example decision tree based on a number of flight parameters.

In embodiments, the quality check processing can enable a user to select the number of decision trees of the mind map for the analysis. An example of a decision tree is shown in FIG. 9, which is constructed using nodes and conditions. The output of the decision tree is a binary value of 0 or 1, for conditions that do not meet the threshold or satisfy it. In the example of FIG. 9, the node with wind speed is the root node that outputs 1 if the average value of the wind speed is less than 10 mph. The node outputs 0 if the wind speed is greater than 10 mph. Depending on the output, in the next step, a condition on wind direction fluctuation or pitch standard deviation will be examined in the next level nodes. Note that only one of the conditions at these nodes will be tested because it is impossible to have both 0 and 1 outputs. Checking the nodes will continue this way until reaching a leaf node, the node where no other node exists afterwards. At this node, whatever output of the node (i.e., 0 or 1) will be assumed as the value of the tree. Several of these decision trees may be constructed using the parameters in Table 1. For example, one node may apply a threshold condition related to standard deviation of pitch, while another node can apply a threshold condition related to max speed and so on. Also, a decision tree with more depths can also be constructed. The example decision tree shown here is level two. If one adds a new level of roots to the current tree, the level will increase by one. Decision trees with a large number of levels are more complex and suited for more complex tasks. Typically, more decision trees are better because they generate a more reliable probability score.

Figure 10:
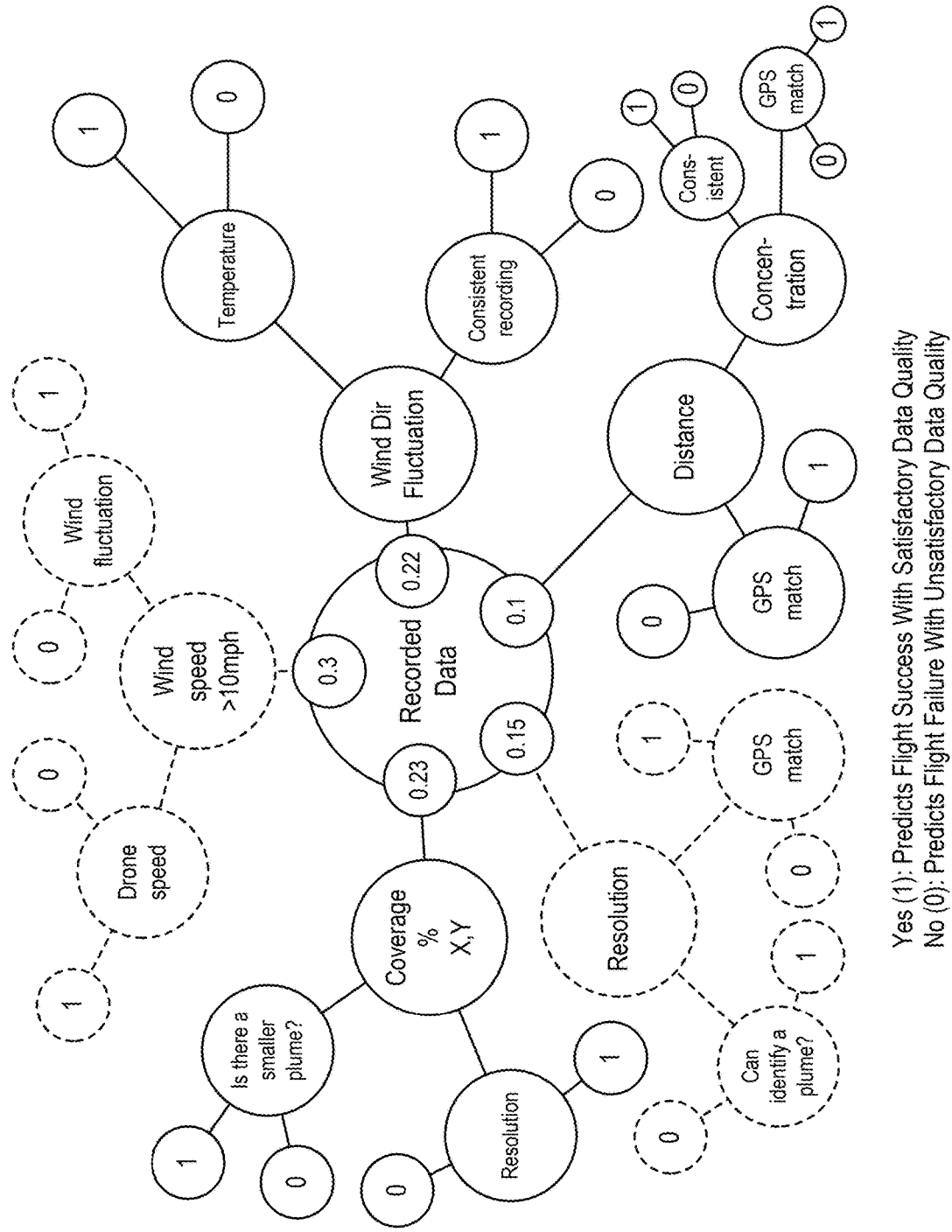
FIG. 10 is a schematic diagram of an example mind mesh that employs five decision trees.

The process of the quality check can be organized as a mind map that combines the binary data values output from multiple binary decision trees to generate a numerical data value that relates to predicted success of a flight and predicted quality of the data obtained from the flight. Note that the mind map can simplify the structure of the multiple decision trees and defines how each decision tree contributes to the numerical data value output. An example of a mind map constructed with five decision trees is shown in FIG. 10. Note that for illustration purposes, all of the five decision trees of FIG. 10 are level two trees in this example. However, in practice, one can use a combination of decision trees with different levels. In this embodiment, the output of each decision tree has a weight that will be added to the numerical data value output (e.g., final probability score) if the output of that decision tree is 1. Other mechanisms can be used to combine the output of the multiple decision trees if desired.

The multiple binary decision trees of the mind map can be constructed according to a number of well-known algorithms to determine the parameter or attributes of the nodes and the order of the nodes within each binary decision tree and the appropriate split point for the nodes for each binary decision tree. For example, the multiple binary decision trees of the mind map can be constructed from one or more of the following well-known algorithms: i) CART-Classification and Regression Tree algorithm; ii) ID3-Iterative Dichotomiser algorithm; iii) C4.5 algorithm; and iv) CHAID-Chi-squared Automatic Interaction Detection algorithm. Other suitable methods can also be used to construct the multiple binary decision trees if desired. The construction of the binary decision trees of the mind map can be derived from data obtained from flights with known or human-annotated label data that represents flight success with satisfactory data quality or flight failure with unsatisfactory data quality. One or more of the multiple binary decision trees can be constructed from different parameters of the data. Alternatively or additionally, one or more of the multiple binary decision trees can be constructed from different samples of the data, such as data obtained from different flights.

In yet another aspect, the present disclosure provides a workflow that employs multiple elements to perform mobile detection of methane emissions in an industrial facility. A UAV is configured to carry a methane gas sensor. A ground station is configured to include a weather station or weather service that collects and distributes weather information (such as wind speed, wind direction, atmospheric temperature and pressure, etc.) and a computer system (such as a laptop) executes one or more software applications. Such software application(s) is (are) configured to access weather information (including wind speed and wind direction) at or near the facility as provided by the weather station or weather service and use the weather information to determine one or more flight paths that cover one or more scan areas associated with the facility. The software application(s) can also communicate with a cloud computing environment that provides additional information that can be used to determine the one or more flight paths. For example, the additional information can relate to the industrial facility (such as boundaries, equipment bounds using polygons, exclusion areas, etc.) and possibly relate to one or more prior flights/missions that inspected the industrial facility. In embodiments, the flight path(s) can be configured to cover one or more scan areas associated with the facility. In embodiments, the scan area(s) can be located downwind of the facility in high wind conditions, or above the facility in light wind conditions. A physics-based model can be run to determine the location of the scan area(s). The UAV is flown and controlled to follow the flight path(s). During the flight of the UAV, the methane gas sensor mounted to the UAV records measurements of methane gas concentration over the flight path(s)/scan area(s). Times-series data representing such methane gas concentration measurements together with time-series telemetry data (or flight path data) of the UAV is stored in electronic storage (e.g., USB storage) onboard the UAV during the flight. Once the flight is complete, the times-series data is transferred from the electronic storage onboard the UAV to one or more data processing systems, which processes the time-series data to run one or more quality control checks and interpretation of the time-series data for detection of methane emission at the facility and estimation of the source location of such methane emission, and visualization and interpretation of these results.

Figure 11A:
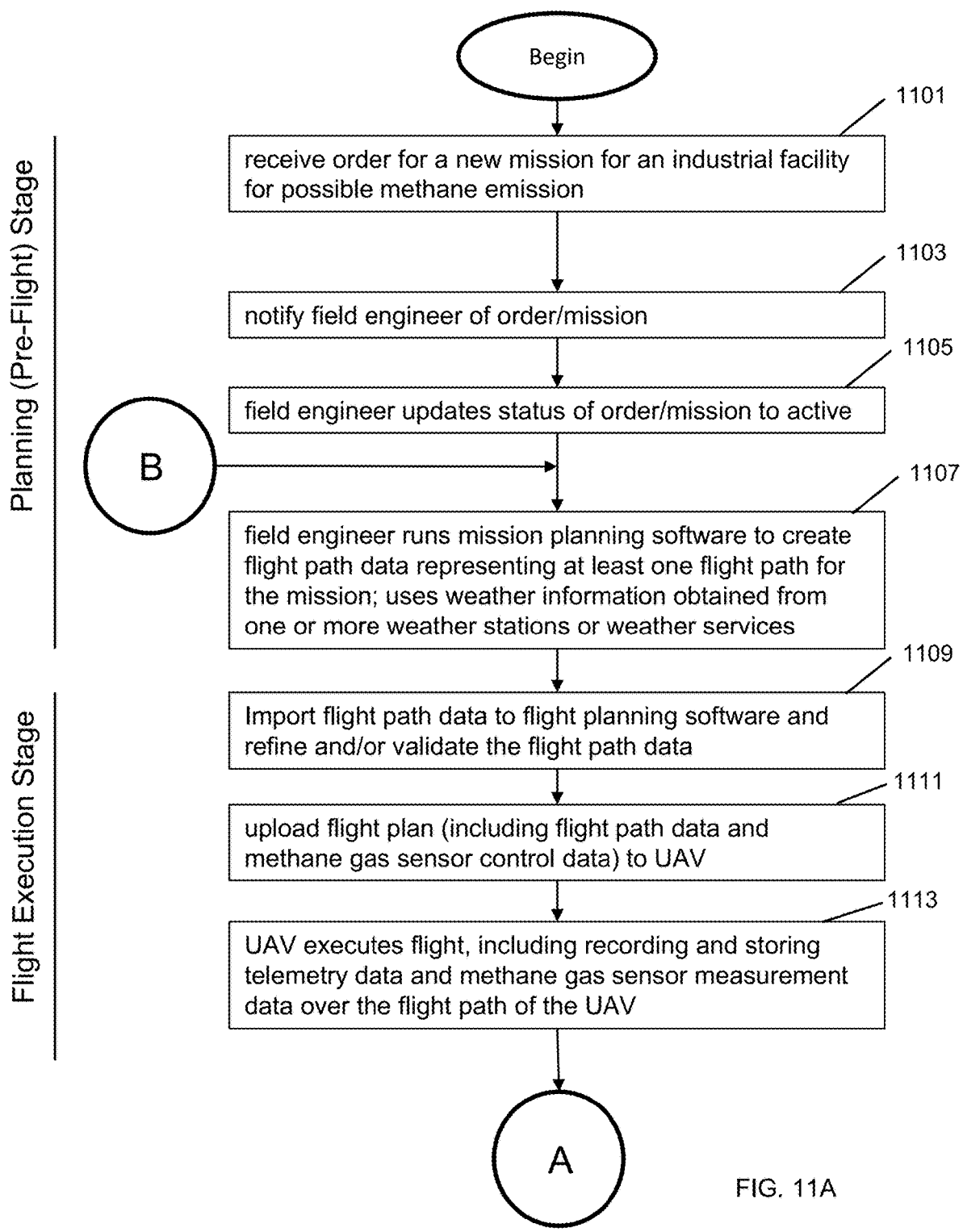
FIGS. 11A and 11B, collectively, is a flow chart illustrating an embodiment of a workflow according to the present disclosure.
Figure 11B:
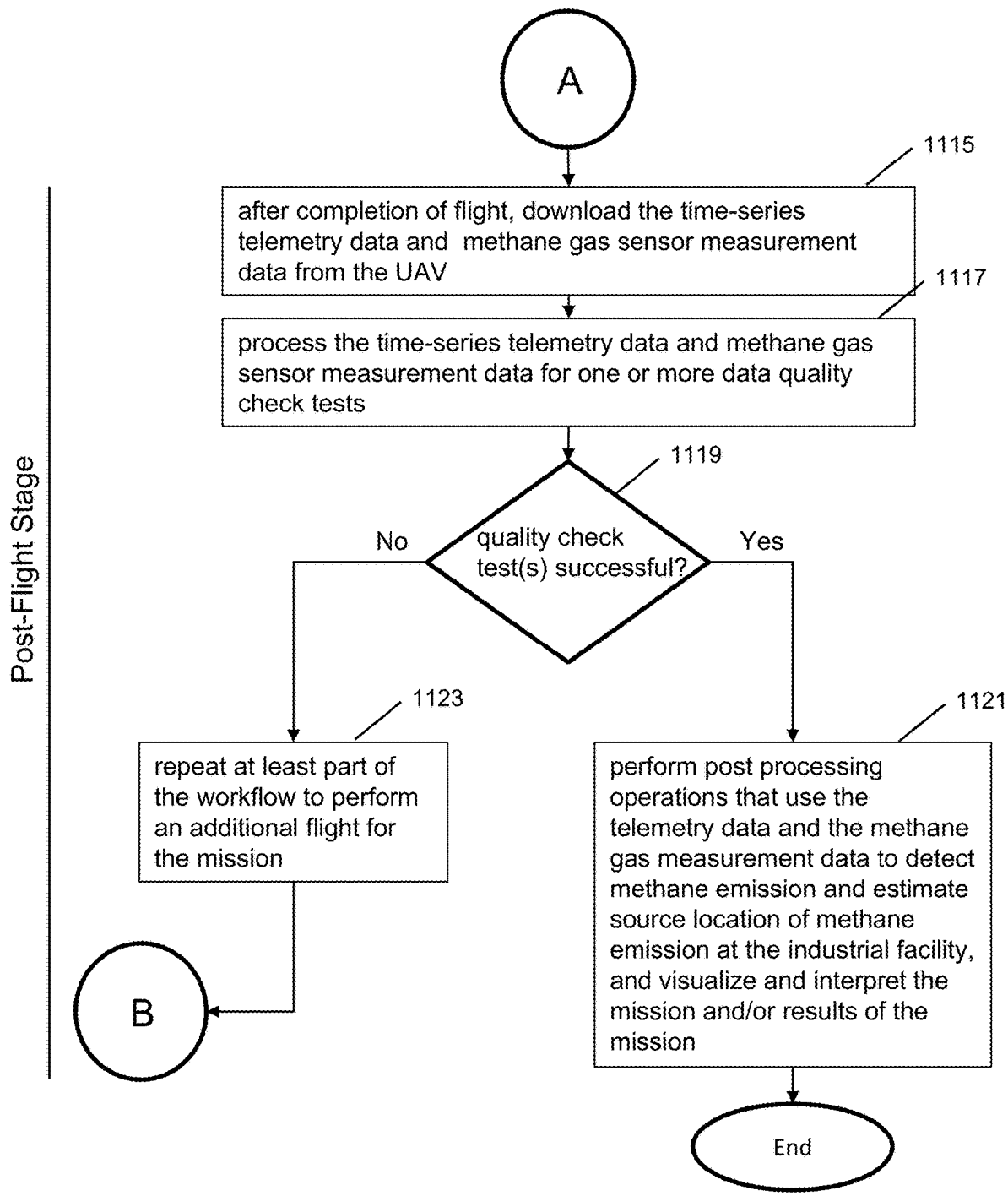

FIGS. 11A and 11B, collectively, is a flowchart that illustrates an embodiment of a workflow according to the present disclosure. The workflow is logically partitioned into three successive stages, including a planning (pre-flight) stage, a flight execution stage, and a post-flight stage.

The planning (pre-flight) stage includes steps 1101 to 1107 as shown.

In step 1101, an order for a new mission for inspecting an industrial facility for possible methane emission is received.

In step 1103, a field engineer is notified of the order or mission.

In step 1105, the field engineer updates the status of the order/mission to active.

In step 1107, the field engineer runs mission planning software to create flight path data representing at least one flight path for the mission. The mission planning software uses weather information obtained from one or more weather stations or a weather service to create the flight path data. The mission planning software can also communicate with a cloud computing environment that provides additional information that can be used to create the flight path data. For example, the additional information can relate to the industrial facility (such as boundaries, equipment bounds using polygons, exclusion areas, etc.) and possibly relate to one or more prior flights/missions that inspected the industrial facility. In embodiments, the flight path(s) for the mission can be configured to cover one or more scan areas associated with the industrial facility. The one or more scan areas can be configured to cover all areas where a methane leak or methane emission from the industrial facility can occur. In embodiments, the scan area(s) can be located downwind of the facility in high wind conditions, or above the facility in light wind conditions. A physics-based model can be run to determine the location of the scan area(s).

The flight execution stage includes steps 1109 to 1113 as shown.

In step 1109, the flight path data can be imported into flight planning software that refines and/or validates the flight path data.

In step 1111, a flight plan is uploaded to the UAV. The flight plan includes the flight path data of 1109 and possibly data that controls the measurements/sampling of the methane gas sensor during the flight of the UAV (step 1113).

In step 1113, the UAV executes the flight, including recording and storing telemetry data and methane gas sensor measurement data over the flight path of the UAV. The UAV is flown and controlled to follow the flight path(s) automatically through the use of one or more navigational instruments (such as a GPS sensor) under the supervision of an operator. Alternatively, the flight of the UAV can operate under remote control by a human operator, or with various degrees of autonomy, such as autopilot assistance up to a fully autonomous aircraft that has no provision for human intervention. During the flight of the UAV, the methane gas sensor mounted to the UAV records measurements of methane gas concentration over the flight path(s)/scan area(s). Times-series data representing such methane gas concentration measurements together with telemetry data of the UAV is stored in electronic storage (e.g., USB storage) onboard the UAV during the flight.

The post-flight stage includes steps 1115 to 1123 as shown.

In step 1115, after the flight is complete, the times-series data collected during the flight is transferred from the electronic storage onboard the UAV to a data processing system.

In step 1117, the data processing system is configured to process the time-series telemetry data and methane gas sensor measurement data for one or more data quality check test(s). If the one or more data quality check tests are successful, the operations continue to step 1121. Otherwise (for the case where the one or more data quality check tests are not successful), the operations continue to step 1123.

In step 1121, the data processing system (or another data processing system) is configured to perform post-processing operations that use the time-series telemetry data and the methane gas measurement data to detect methane emission and estimate source location of methane emission at the industrial facility. In embodiments, the data processing system can be configured to utilize artificial intelligence and/or computer vision algorithms to estimate rate of methane emission and source location of methane emission at the industrial facility. The time-series methane gas measurement data for the mission, the time-series processing the at least one 2D image using artificial intelligence and/or computer vision algorithms to identify anomalies or patterns related to methane emission in the at least one 2D image. The time-series telemetry data for the mission, and/or data representing the rate of methane emission and source location of methane emission at the industrial facility as determined by the post-processing operations can be communicated to the cloud computing environment. The cloud computing environment can be configured to generate and present a graphical user interface to one or more users that allows a user to visualize and/or interpret the mission and/or the results of the mission. The workflow ends after step 1121.

In step 1123, the operations can revert (for example to step 1107 as shown) to repeat at least part of the workflow to plan and perform an additional flight for the mission, including parts of the flight planning stage, the flight execution stage for the additional flight, and the post-flight stage for data quality testing and data interpretation as described herein.

In embodiments, part of all of the operations of the post-flight stage can be managed or performed by domain experts that are different from the personnel that manage or perform the operations of the flight execution stage. In embodiments, such personnel can be associated with a business entity that has the requirements to fly the UAV, such as a license, insurance, etc.

Figure 12:
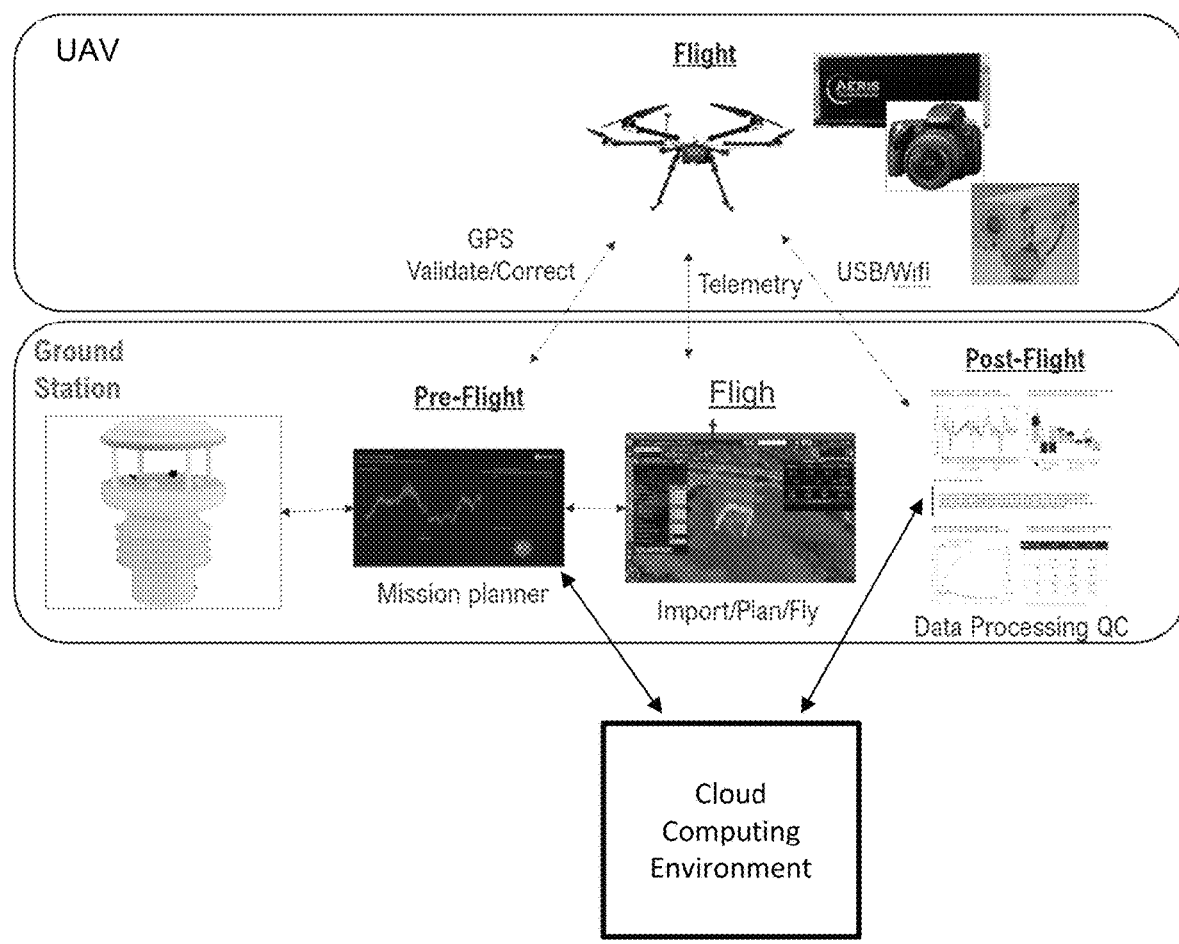
FIG. 12 is a schematic diagram illustrating another embodiment of a workflow according to the present disclosure.

FIG. 12 is a schematic diagram illustrating another embodiment of a workflow according to the present disclosure, which includes aspects of the three successive stages of FIGS. 11A and 11B, including a planning (pre-flight) stage, a flight execution stage, and a post-flight stage.

Figure 13:
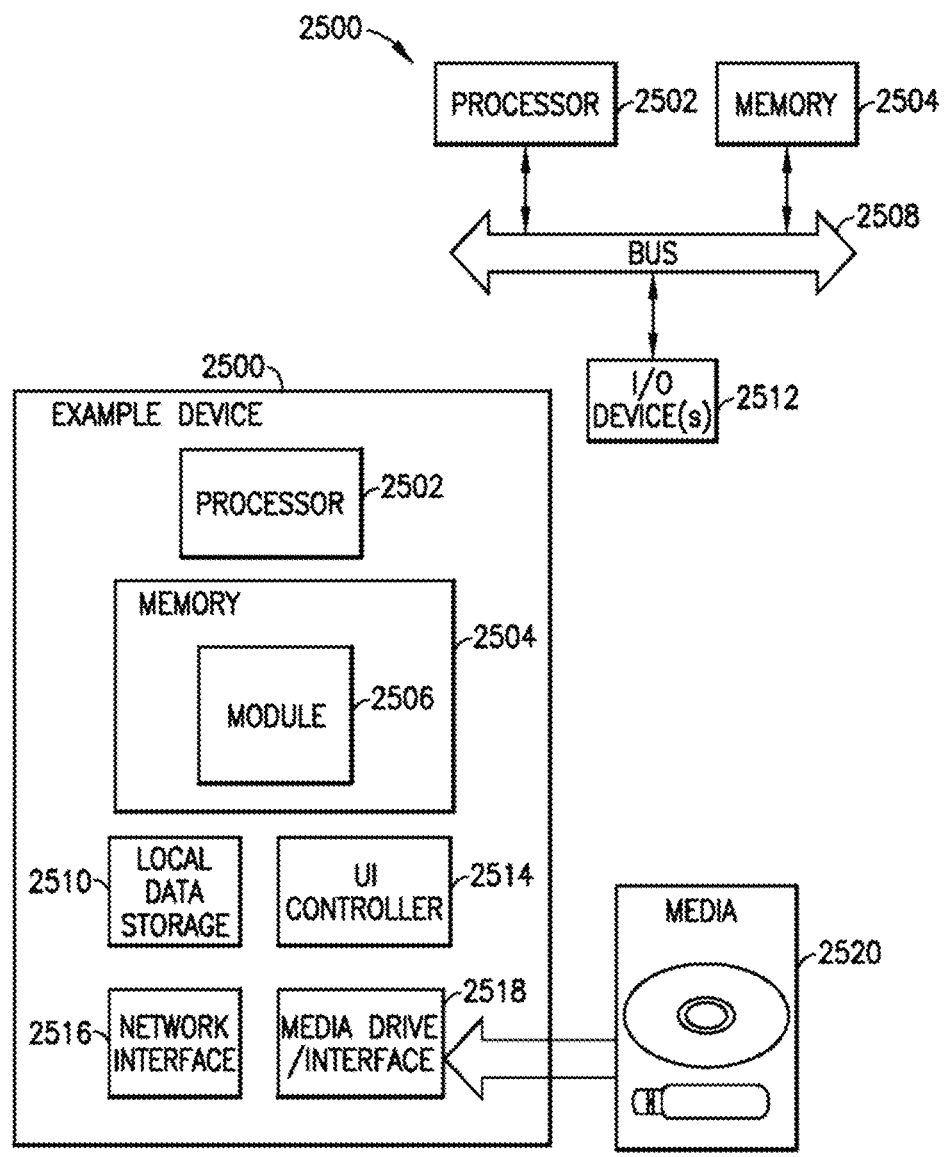
FIG. 13 is a schematic diagram of a computer system.

FIG. 13 illustrates an example device 2500, with a processor 2502 and memory 2504 that can be configured to implement various embodiments of the methods and processes and workflows as discussed in the present application. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth). One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network. A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various systems and processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable, and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, general-purpose computer, special-purpose machine, virtual machine, software container, or appliance) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Some of the methods and processes described above can be implemented as computer program logic for use with the computer processor. The computer program logic may be embodied in various forms, including a source code form or a computer executable form. Source code may include a series of computer program instructions in a variety of programming languages (e.g., object code, assembly language, or high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for characterizing methane emission at an industrial facility using an unmanned air vehicle (UAV) equipped with at least one navigational instrument and at least one methane gas sensor, the method comprising:
    defining a scan area associated with the industrial facility, wherein the scan area is a two-dimensional (2D) plane;
    logically partitioning the scan area into a plurality of pixels based on information provided by an intelligent agent, wherein the plurality of pixels include a plurality of subsquares spatially distributed over the scan area;
    defining a flight plan for a flight of the UAV, wherein the flight plan covers the plurality of pixels of the scan area;
    operating the UAV to execute the flight plan and collect time-series navigational data from the at least one navigational instrument and time-series sensor data from the at least one methane gas sensor as the UAV executes the flight plan;
    generating a predicted success of the flight by applying a mind map to the time-series navigational data and the time-series sensor data;
    responsive to the predicted success being less than a threshold, dynamically adjusting the flight plan of the UAV during the flight by operation of the intelligent agent to ensure that the flight plan of the UAV covers the plurality of pixels of the scan area; and
    constructing at least one 2D image of methane concentration over the plurality of pixels of the scan area from the time-series navigational data and the time-series sensor data.

2. A method according to claim 1, wherein the intelligent agent is configured to use at least one model to dynamically adjust speed or stabilization of the UAV during the flight.

3. A method according to claim 2, wherein the at least one model comprises at least one of a physics-based model and an artificial intelligence model.

4. A method according to claim 1, further comprising processing the at least one 2D image using artificial intelligence and/or computer vision algorithms to identify anomalies or patterns related to the methane emission at the industrial facility.

5. A method according to claim 4, wherein processing of the at least one 2D image employs an autoencoder configured to identify the anomalies or the patterns related to the methane emission at the industrial facility.

6. A method according to claim 4, wherein processing of the at least one 2D image is further configured to estimate a rate of the methane emission and a source location of the methane emission at the industrial facility.

7. A method according to claim 6, wherein processing of the at least one 2D image employs an artificial intelligence model configured to quantify the rate of the methane emission and estimate an approximate location of the source location of the methane emission at the industrial facility.

8. A method according to claim 4, wherein processing of the at least one 2D image is further configured to visualize a rate of the methane emission and a source location of the methane emission at the industrial facility.

9. A method according to claim 4, wherein the intelligent agent is configured to provide flight plan information used to define the flight plan such that a spatial distribution of pixels in the scan area and the time-series sensor data collected during the flight and the at least one 2D image derived therefrom comply with an input of the artificial intelligence and/or computer vision algorithms.

10. A method according to claim 1, wherein: the pixels comprise subsquares that cover the scan area; and/or the scan area is defined in at least one the 2D plane spaced from the industrial facility is a horizontal 2D plan spaced above the industrial facility.

11. A method according to claim 1, wherein a wind speed and a direction at or near the industrial facility at time of the flight are determined from data provided by a weather station or a weather monitoring service, and the wind speed and the direction are used to define the scan area.

12. A method according to claim 1, wherein the at least one 2D image is constructed by scaling raw methane concentration readings to a predefined range of pixel values over the plurality of pixels of the scan area.

13. A method according to claim 1, wherein the at least one 2D image is constructed using an image smoothing algorithm.

14. A method according to claim 13, wherein the image smoothing algorithm comprises a spline smoothing algorithm or a sinc smoothing algorithm.

15. A method according to claim 1, wherein the flight of the UAV operates under remote control by a human operator.

16. A method according to claim 1, wherein the flight of the UAV operates under remote control with a degree of autonomy.

17. A method according to claim 16, wherein the remote control includes autopilot assistance, or the remote control provides for fully autonomous control of the UAV with no provision for human intervention.

18. The method of claim 1, wherein the mind map includes a plurality of binary decision trees for evaluating a quality of at least one of the time-series navigational data or the time-series sensor data, wherein the predicted success is based at least in part on the quality.

19. The method of claim 18, further comprising generating, for each of the plurality of binary decision trees, a plurality of binary classification labels associated with the time-series navigational data and the time-series sensor data, and wherein the predicted success is based on the plurality of binary classification labels.

20. A system, comprising:
    a processor and memory, the memory including instructions that cause the processor to:
        defining a scan area associated with an industrial facility, wherein the scan area is a two-dimensional (2D) plane;
        logically partitioning the scan area into a plurality of pixels based on information provided by an intelligent agent, wherein the plurality of pixels include a plurality of subsquares spatially distributed over the scan area;

defining a flight plan for a flight of an unmanned aerial vehicle (UAV), wherein the flight plan covers the plurality of pixels of the scan area;

operating the UAV to execute the flight plan and collect time-series navigational data from at least one navigational instrument and time-series sensor data from at least one methane gas sensor as the UAV executes the flight plan;

generating a predicted success of the flight by applying a mind map to the time-series navigational data and the time-series sensor data;

responsive to the predicted success being less than a threshold, dynamically adjusting the flight plan of the UAV during the flight by operation of the intelligent agent to ensure that the flight plan of the UAV covers the plurality of pixels of the scan area; and constructing at least one 2D image of methane concentration over the plurality of pixels of the scan area from the time-series navigational data and the time-series sensor data.

* * * * *